United States Patent
Lammerink et al.

(10) Patent No.: US 7,895,905 B2
(45) Date of Patent: Mar. 1, 2011

(54) FLOWMETER

(75) Inventors: Theodorus Simon Josef Lammerink, Enschede (NL); Marcel Dijkstra, Enschede (NL); Jeroen Haneveld, Lochem (NL); Remco John Wiegerink, Hengelo (NL)

(73) Assignee: Berkin B.V., Ruurlo (NL)

( * ) Notice: Subject to any disclaimer, the term of this patent is extended or adjusted under 35 U.S.C. 154(b) by 42 days.

(21) Appl. No.: 12/335,045

(22) Filed: Dec. 15, 2008

(65) Prior Publication Data
US 2009/0308177 A1 Dec. 17, 2009

(30) Foreign Application Priority Data
Jan. 11, 2008 (NL) .................................. 1034905

(51) Int. Cl.
*G01F 1/84* (2006.01)
(52) U.S. Cl. ................................. 73/861.355
(58) Field of Classification Search ............ 73/861.352, 73/861.356, 861.357, 861.355
See application file for complete search history.

(56) References Cited

U.S. PATENT DOCUMENTS

| | | | | |
|---|---|---|---|---|
| 5,233,213 A * | 8/1993 | Marek | ........................ | 257/415 |
| 5,970,790 A * | 10/1999 | Jouwsma et al. | ......... | 73/204.12 |
| 6,477,901 B1 * | 11/2002 | Tadigadapa et al. | .... | 73/861.352 |
| 6,615,655 B1 | 9/2003 | Sakai et al. | | |
| 7,340,965 B2 * | 3/2008 | Mehendale et al. | .... | 73/861.355 |
| 2006/0037187 A1 | 2/2006 | Sparks et al. | | |

FOREIGN PATENT DOCUMENTS

| | | |
|---|---|---|
| EP | 1 291 621 | 3/2003 |
| WO | 2007/147786 | 12/2007 |

OTHER PUBLICATIONS

Search Report dated Jul. 30, 2008, from corresponding Dutch application.
Peter Enoksson et al., "A Silicon Resonant Sensor Structure for Coriolis Mass-Flow Measurements", Journal of Microelectromechanical Systems, vol. 6, No. 2, Jun. 1997, XP011034742, ISSN 1057-7157, pp. 119-125.

* cited by examiner

*Primary Examiner*—Jewel Thompson
(74) *Attorney, Agent, or Firm*—Young & Thompson (57) ABSTRACT

A flowmeter including a system chip with a silicon substrate provided on a carrier, in an opening whereof at least one silicon flow tube is provided for transporting a medium whose flow rate is to be measured, the tube having two ends that issue via a wall of the opening into channels coated with silicon nitride in the silicon substrate, wherein the flow tube forms part of a Coriolis flow sensor and/or a thermal flow sensor, and wherein the channels are preferably in communication through the carrier with connection lines to the external world.

15 Claims, 11 Drawing Sheets

FLOWMETER

The invention relates to a flowmeter for measuring the flow of a medium.

An effective instrument for measuring flows is the Coriolis flowmeter.

Another category is formed by flowmeters of the thermal type. The invention has for its object to provide a flowmeter and a technology for its manufacture which render possible the measurement of very small flow rates, below 1 g/h, in combination with a universal manufacturing technology that renders it possible to manufacture different types of measuring devices and to integrate them with the additional sensor equipment referred to above.

The flowmeter according to the invention is for this purpose characterized in that it has a system chip which comprises a flow sensor, the system chip including a silicon substrate in an opening whereof a silicon nitride flow tube is provided for transporting a medium whose flow rate is to be measured, said flow tube having an inlet end and an outlet end, which ends each merge via a wall of the opening into a silicon nitride coated channel in the silicon substrate.

The invention also relates to a method of manufacturing a system chip for a flowmeter as described above. This method is characterized by the following steps:

providing a monocrystalline silicon substrate in which a SiN tube is realized by means of SiN deposition steps and partially etching away and partially exposing through etching so as to realize a tube structure that is fixed at at least one side and is otherwise free, by means of micro system technology (MST).

The invention will be explained in more detail below, by way of example, with reference to the drawing, in which:

FIG. 1b is a front elevation of the flowmeter of FIG. 1a;

FIG. 1c is a cross-sectional view of the flowmeter of FIG. 1a;

Corresponding components have been given the same reference numerals as much as possible in the Figures.

Figure 1A:
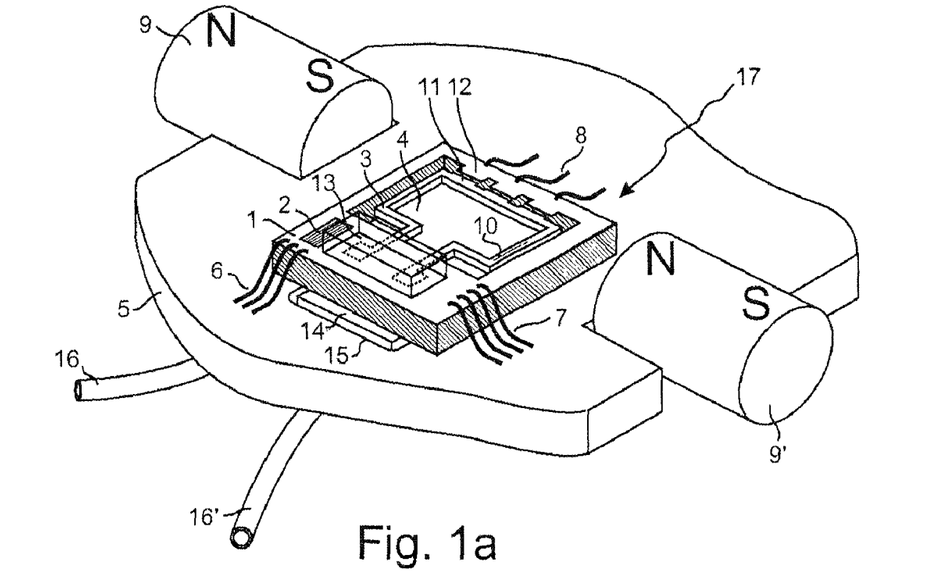
FIG. 1a is a diagrammatic elevation of an embodiment of a flowmeter according to the invention with a system chip and a Coriolis flow sensor.

FIG. 1a shows a system chip 17 comprising a monocrystalline silicon substrate 1 in which an opening 4 has been etched. The system chip 17 in this example has a Coriolis flow sensor with a Coriolis tube 3 of silicon nitride which is freely suspended in the opening 4. In another example the flow sensor may be a thermal flow sensor. In either case an absolute pressure sensor 2, such as a Pirani pressure sensor, may be integrated in or on the substrate 1. The Coriolis tube has a loop shape, in this case a rectangular loop shape. Other loop shapes, such as triangular, trapezoidal, or U-shaped, are also possible.

The system chip 17 is (monolithically) assembled with two mutually opposed permanent magnets 9, 9' which are arranged on a carrier 5, for example a PCB (printed circuit board) of ceramic or synthetic resin material with conductive, e.g. copper or silver, tracks thereon. The substrate is manufactured from a <1,0,0> Si wafer mounted on the carrier 5. The electrical connections between the system chip 17 and the carrier 5 are provided by so-termed bonding wires arranged in groups 6, 7, and 8. The bonding wires 6 (from and to the sensor chip) serve for conditioning the chip temperature/c.q. temperature control. A local temperature sensor and an (ambient) pressure sensor 2 may be present, if so desired.

The pressure sensor 2, if present, measures the absolute pressure. This is important because the quality factor of the tube's vibration depends inter alia on the air pressure.

The bonding wires 7 serve for bringing the freely suspended tube 3 into vibration. The bonding wires 8 serve for controlling the read-out elements for the freely suspended tube.

Figures 2A, 2B, 2C:
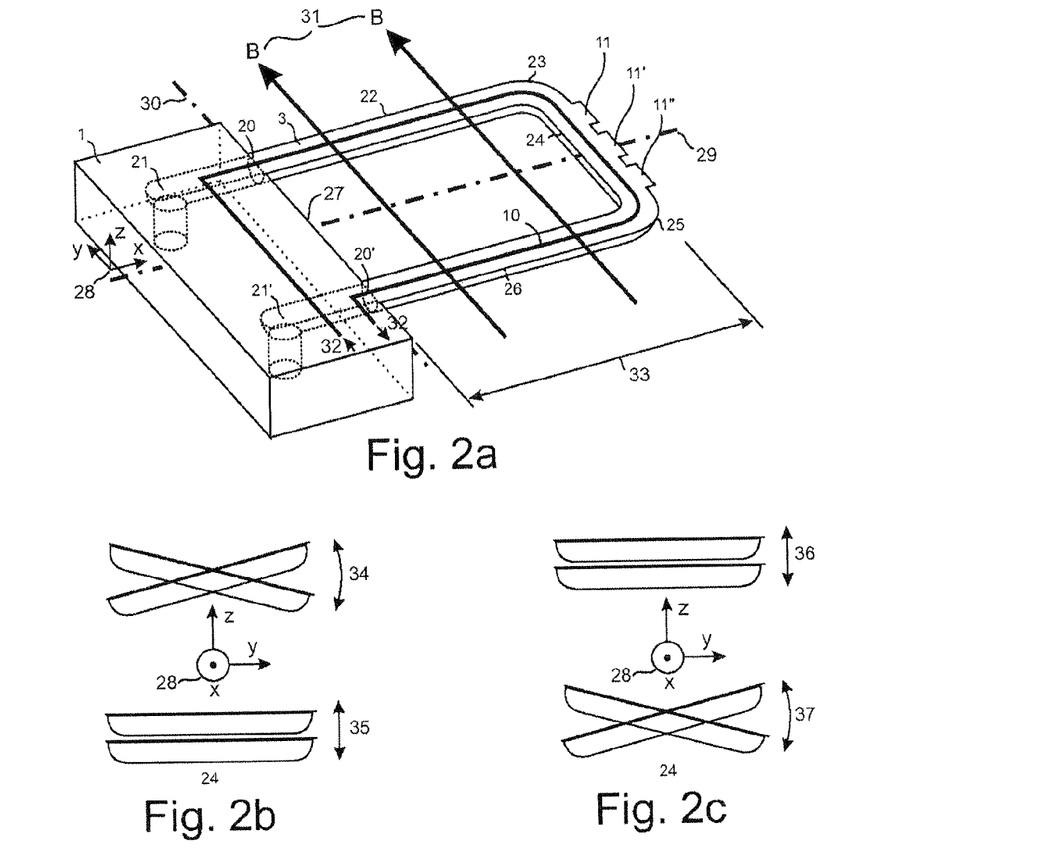
FIG. 2a presents a clarification of the operation of a Coriolis flow sensor in an arrangement with a U-shaped Coriolis tube (with a diagrammatically indicated actuation and sensing of the vibrating Coriolis tube)
FIG. 2b shows a Lorentz actuation (torsion) and capacitive sensing (flapping) of the tube.
FIG. 2c shows a thermal actuation (torsion) and capacitive sensing (flapping) of the tube.

The freely suspended tube 3 together with the rod magnets 9, 9', a current conductor (wire) 10 on the tube 3, and capacitive sensor elements 11 on the tube and 12 on the system chip 17 forms a so-termed Coriolis flowmeter, which is further clarified in FIGS. 2a to 2c. A body of soft magnetic material may optionally be provided between the rod magnets 9 and 9' in a location within the loop so as to enhance the efficiency of the magnet arrangement.

The hydraulic coupling of the system chip 17 to the external world is provided by pressure blocks 13 and 14. (see FIG. 1b) Fluid connections 16 and 16' are present in the pressure block 14. The application of a pressure force between the pressure block 13, the substrate 1, and the pressure block 14 provides a gastight closure of the fluid connection between the tubes 15, 15' and the substrate 1 (cf. FIG. 3b for more details).

Figure 1B:
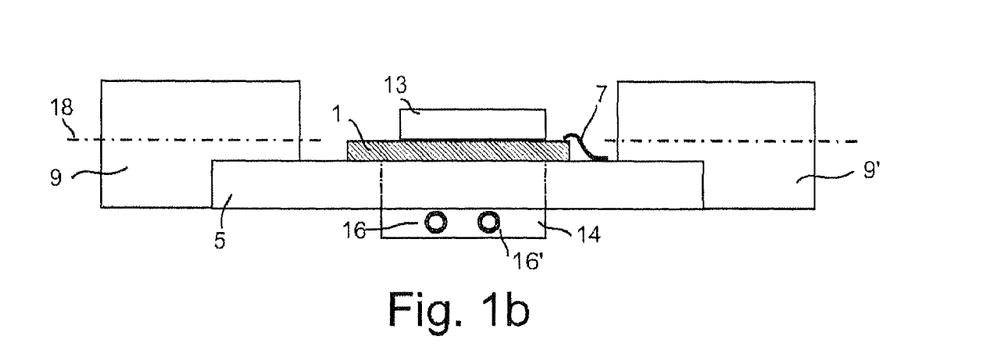

FIG. 1b shows the same device as FIG. 1a, but viewed from the front. The 'upper side' of the system chip 17 lies on the centerline 18 of the rod magnets 9 and 9'.

Figure 1C:
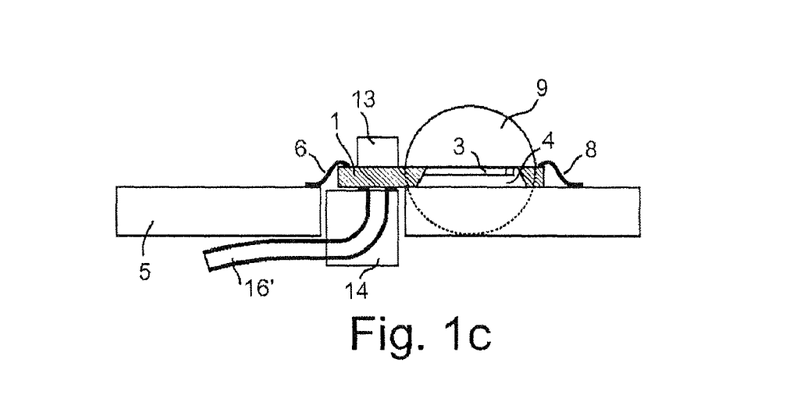

FIG. 1c shows the same device as FIG. 1a, this time taken on a cross-section at the area of the system chip. Bonding wires 7 (from/to the sensor chip) for the tube actuation control on the PCB are visible, as are bonding wires 8 (from/to the sensor chip) for the tube sensing control on the PCB. The bonding wires 6, 7 and 8 thus serve the integrated sensors/transducers of the Coriolis sensor.

(In a prototype sensor, Kelvin contacts are used for a temperature measurement of the tube and probe pins for the connections.)

A housing may be provided around the assembly for protection; this is not shown. The housing can be in the form of a cap which defines a hermetically sealed evacuated enclosure containing the free-hanging tube.

A pressure measurement of the medium flowing through the tube may also optionally be integrated. A thermal flow measurement of the medium may also be integrated, if so desired.

Furthermore, an absolute pressure measurement by means of a relative pressure measurement (membrane somewhere in the tube) with respect to the measured absolute ambient pressure is also possible. A complete multi-parameter measuring system is thus obtained.

FIG. 2a shows a U-shaped Coriolis tube 3 that was made by MST technology, that is freely suspended, and that is partly embedded in the silicon substrate where it merges into inlet and outlet channels present in the substrate and issuing at the side of the substrate 1 opposite to the freely suspended portion 3. The applied magnetic field 31 is indicated by arrows B, and the current passed through the conductor 10 on the tube 3 for generating the Lorentz forces is referenced 32.

During operation, a medium enters at 21 and exits at 21'. The mass flow of a medium is the mass that passes through a cross-section of the tube per second. If the mass is a self-contained quantity, the mass flow through the U-tube of FIG. 2a must be the same everywhere (otherwise mass will accumulate somewhere, or mass disappear somewhere).

Therefore, the mass flow Q has the same (constant) modulus (or vector 'length') everywhere in the tube 3. However, Q points in the positive x-direction in tube portion 22 and in the negative x-direction in tube portion 26.

There are various methods for realizing and applying a Coriolis mass flowmeter with the tube 3 of FIG. 2a, for example the tube is vibrated by means of a Lorentz actuator in a flapping mode or in a torque mode (cf. FIG. 2b); or heat is generated in the conductor pattern 10 through thermal excitation, which leads to a flapping mode (cf. FIG. 2c).

Generally spoken, a Lorentz actuator can comprise a magnet means which at a portion of the tube produces a magnetic field. This field can be a static field or a dynamic field. If an electric current is conveyed through the conductor 10, (AC current in the case of a static magnetic field, DC current in the case of a dynamic magnetic field) a Lorentz force is exerted on the tube and the tube vibrates in a flapping mode. By producing two magnetic fields a torque can be exerted on the tube (so-called torque excitation) and the tube vibrates in a torque mode. The magnetic field producing means can be in the form of one or more magnets, or in the form of one or more electric coils, or a magnetic (magnetically conducting) yoke equipped with a permanent magnet or an electric coil.

Method 1, FIG. 2b:

The tube is actuated (vibrated) about an axis of rotation 29 (= the x-axis), which in the case of a mass flow leads to a Coriolis force in that location where the distance to the axis of rotation changes, which is at tube portion 24. This Coriolis force on tube portion 24 causes the U-tube 3 to rotate about an axis of rotation 30 (= the y-axis), leading to a translatory movement of the tube portion 24. This (vibratory) actuation movement is referenced 34 in FIG. 2b. The resulting Coriolis-induced rotation about the y-axis is proportional to the mass flow and results in a z-movement 35 of the tube portion 24. The tube portion 24 performs both movements simultaneously, i.e. the actuating torsional vibration 34 and the flapping movement 35 (proportional to the mass flow).

Method 2, FIG. 2c:

The tube is flapped, or actuated (vibrated) about the axis of rotation 30 (= y-axis); this in the case of a mass flow again leads to a Coriolis force in that location where the distance to the axis of rotation changes, which is at tube portion 22 (upward) and tube portion 26 (downward) this time, causing a rotation of the tube portion 24. The (vibratory) actuation movement of the tube portion 24 in the z-direction is referenced 36 in FIG. 2c. The resulting Coriolis-induced rotation about the x-axis 29 is proportional to the mass flow and results in the rotational x-movement 37 of the tube portion 24. Again, the tube portion 24 performs both movements simultaneously, i.e. the actuating flapping vibration 36 and the torsional vibration 37 that is proportional to the mass flow.

Reference numeral 11 (11', 11") in the previous Figures indicates means (projections or tags of SiN) at or on the connecting part between the legs of the U-shaped tube 3. These form capacitances together with their counterpart means (projections or tags) 12 (12', 12") at the substrate side. This renders it possible to detect the movements of the tube in a capacitive manner. One, two, or three such pairs of tags, for example, may be used. Alternatives will be described below with reference to FIGS. 6a and 6b.

Figure 2D:
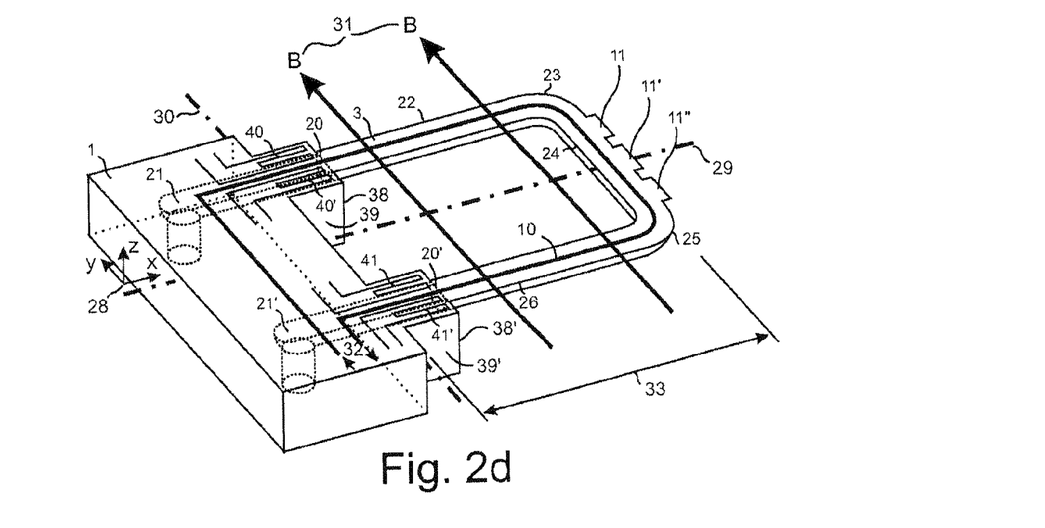
FIG. 2d shows a thermal actuation (flapping, no magnets) and capacitive sensing (torsion)

FIG. 2d diagrammatically shows a system chip with the same U-tube 3 as in FIG. 2a, and also suspended in the same manner. In this case, however, the Lorentz actuation is combined with thermal actuation (torsion). Resistance elements 40, 40' and 41, 41' are provided on the substrate for this purpose, which supply heat to the legs 22 and 26 of the U-tube 3 when energized. The resistance elements in this case are arranged on projecting (bulging) portions 38, 38' of the substrate 1. Upon being energized, each resistance element sends a dynamic heat wave in the z-direction through the respective projecting portion. Adjustment of the energizing currents offers a compensation possibility.

Figure 3A:
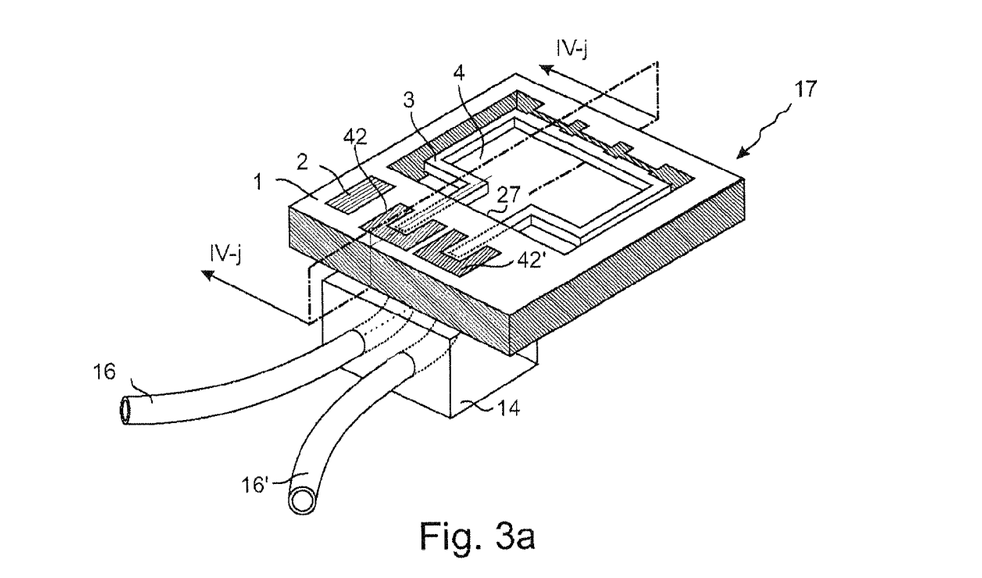
FIG. 3a shows a detail of the system chip of FIG. 1a with a clearly visible pressure sensor of the Pirani type.

FIG. 3a shows a detail of the system chip of FIG. 1a with thick metal layers 42, 42' for guiding the compression force into the main surface of the silicon substrate so as to protect the embedded housings opposite the fluid openings and to leave the SiN membrane exposed. The integrated pressure sensor 2 is clearly visible.

Figure 3B:
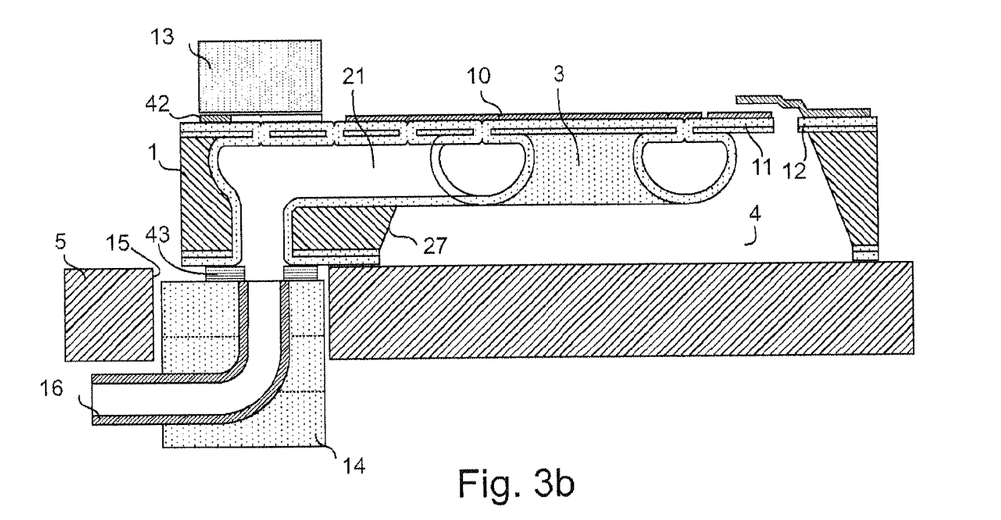
FIG. 3b is a cross-sectional view of the system chip with fluidic coupling of connection tubes.

FIG. 3b is a cross-sectional view taken in the plane IV-j in FIG. 3a after a pressure block 13 has been placed. The fluidic coupling of the connection openings of the system chip (embedded channels 40, 40') to an externally applied fluid tube 16 is clearly visible in this cross-section. The connection is sealed in a gastight manner through plastic deformation of metal ring 43 between the pressure block 14 on the one hand and the silicon substrate 1 on the other. The pressure block 14 here projects through the opening 15 in the carrier 5.

The system chip described above is to be regarded as a fluidic PCB (printed circuit board), for which a tube structure having the desired functions is realized in one process in the cleanroom in one substrate. The tube structure according to the invention may be manufactured by means of the so-termed micro system technology (MST).

An example of this is the following method:

a thin, for example 500 nm thick, first silicon nitride layer ($Si_xN_y$) which is rich in silicon is provided on both sides of a <100> oriented p-type silicon substrate (wafer). Then a 50 nm thick chromium layer is sputtered onto the upper side. This chromium layer is patterned with a photoresist mask having rows of elongate holes (with dimensions of, for example, 6×2 µm), with small interspacings between the holes (for example 2 µm). The pattern in the chromium layer is transferred by means of reactive ion etching (RIE) to the subjacent nitride layer. The channel shape is defined by isotropic plasma etching through the holes in the silicon nitride layer. After the resist mask has been stripped, the chromium mask is removed and a thicker, second $Si_xN_y$ layer is grown to a thickness of approximately 1.4 μm. This will form the channel wall (tube wall) and at the same time seals off the etching holes in the first nitride layer.

Subsequently, a 10/100 nm layer of chromium/platinum is provided by sputtering and patterned by means of lift-off lithography so as to form the metal track (the electrode) which is necessary for making actuation of the structure possible (for example Lorentz actuation).

Furthermore, release windows are provided at the lower side of the wafer and fluidic access holes to the tube at the upper side of the wafer by means of RIE etching, and the structure is separated by means of (KOH) wafer through etching.

A preferred embodiment of the method according to the invention will now be elucidated with reference to FIGS. 4a-j.

Figure 4A:
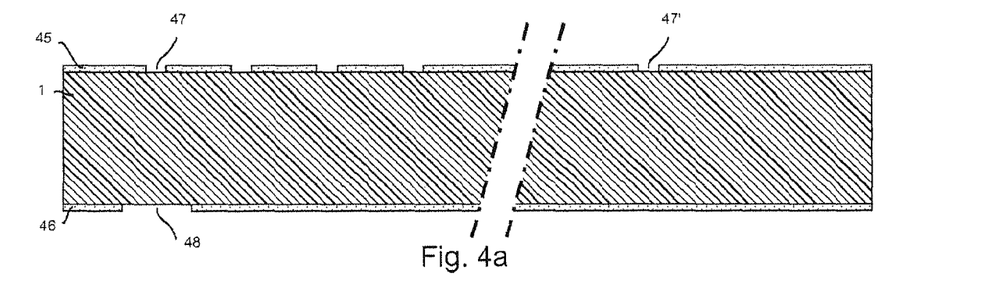
FIGS. 4a-j are cross-sections through a system chip during manufacture.

FIG. 4a relates to a silicon wafer on which the first SiN layer is grown and is patterned on both sides, which yields a cross-section as shown in FIG. 4a: 45 denoting the SiN layer-1 at the upper side, 46 denoting the SiN layer-1 at the lower side, 47 denoting patterned openings in the layer 45 for the SiN tubes 3, 21, and 48 denoting patterned openings in the layer 46 for the fluid coupling to the external world.

Figure 4B:
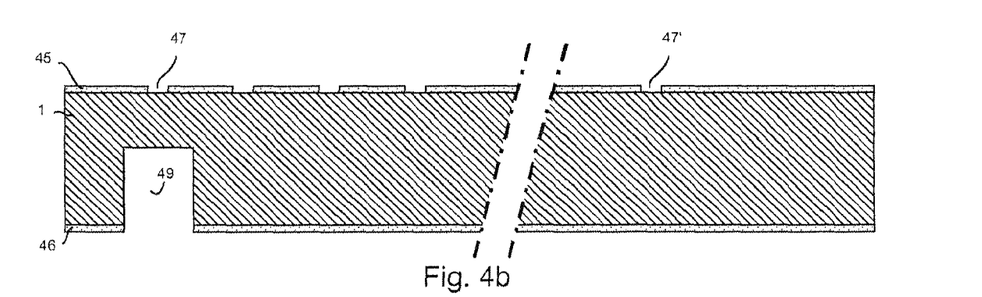
Figure 4C:
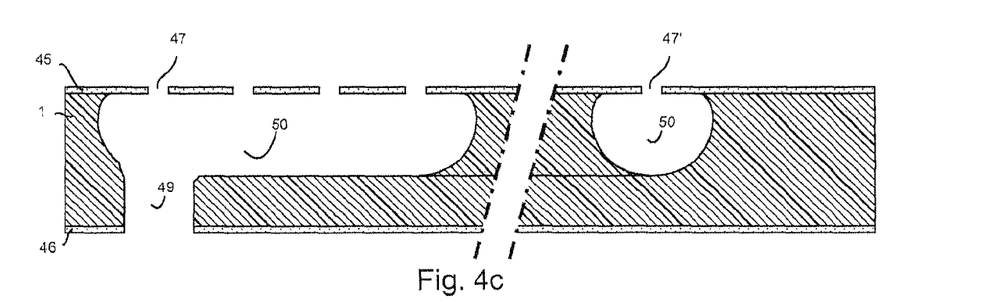

FIG. 2b: after the substrate (side 46) has been etched, a cavity 49 is anisotropically etched via openings 48. Note: steps 4b and 4c may be interchanged!

FIG. 4c: after the substrate (side 45) has been etched, cavities 50 are isotropically etched via openings 47. Note again: 4b and 4c may be interchanged!

Figure 4D:
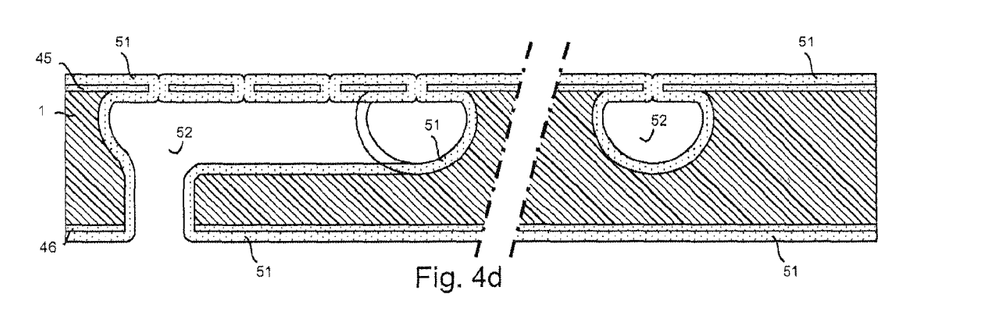

FIG. 4d shows the situation after the thicker, second SiN layer has been grown: 51 denoting the SiN layer-2. Everything is covered with the same thickness, also in the various holes. This is also called 'conform deposition'. The deposition of the SiN layer creates a cavity 52.

Figure 4E:
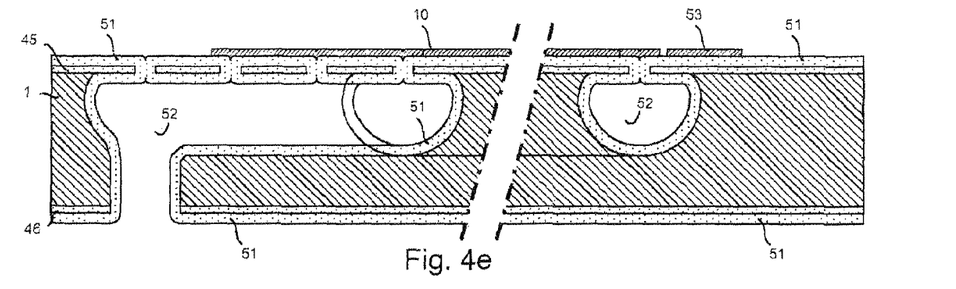

FIG. 4e: deposition of a metal layer and patterning of this layer 10. This will form the current conductor 10 (cf. FIG. 1a) on the tube. Reference numeral 53 denotes the supply wire for the tube electrode of the sensing capacitors. This electrode 53 lies on the tags 11 located on the tube (cf. FIG. 2a). This will be discussed in more detail with reference to FIG. 6.

Figure 4F:
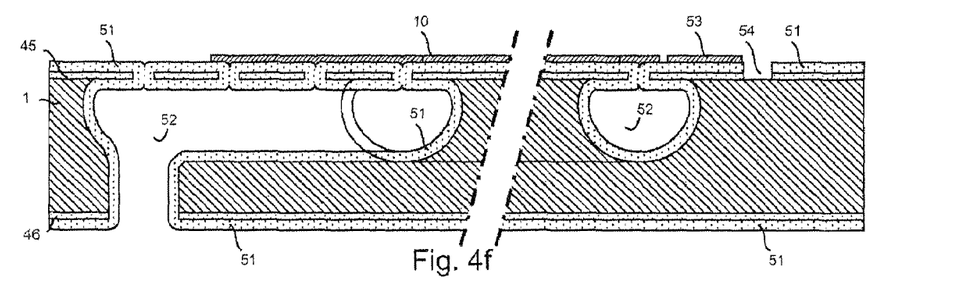

FIG. 4f: patterning of the (by now dual, 45+51) SiN layer at the upper side. If this is omitted, the entire tube 3 will be suspended from a SiN membrane 45+51 at the upper side after the final etching step (4j)! Reference numeral 54 denotes openings in the upper double SiN layer.

Figure 4G:
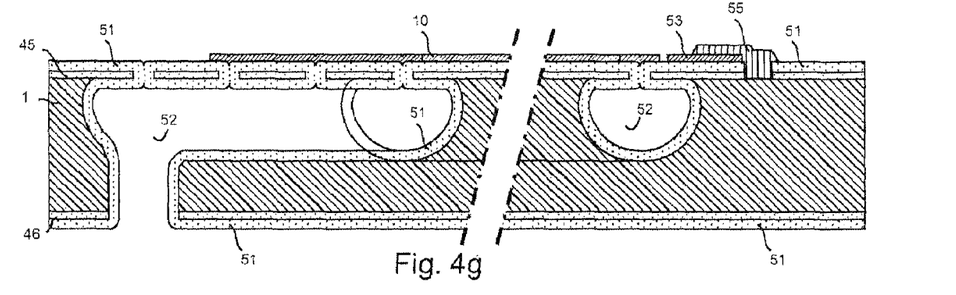

FIG. 4g: providing and patterning of a photoresist layer at the areas of the components of the sensing capacitors, 55 denoting the resist layer that is to serve as a spacer layer.

Figure 4H:
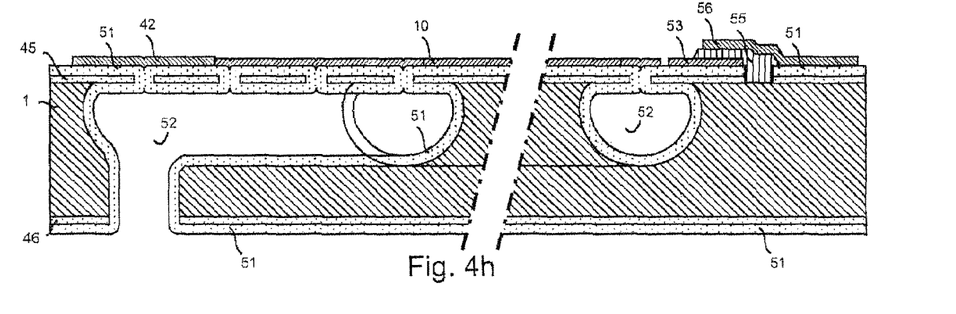

FIG. 4h: providing and patterning of a second, thicker metal layer. The pattern will form the future crossing electrodes at the area of the sensing capacitor, with 56 denoting the patterned electrode, and 42 denoting a layer at the area of the fluid openings for protecting the embedded channels 21.

Figure 4I:
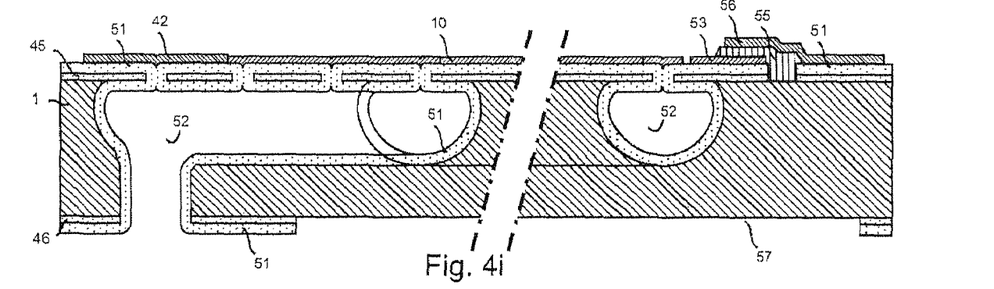
Figure 4J:
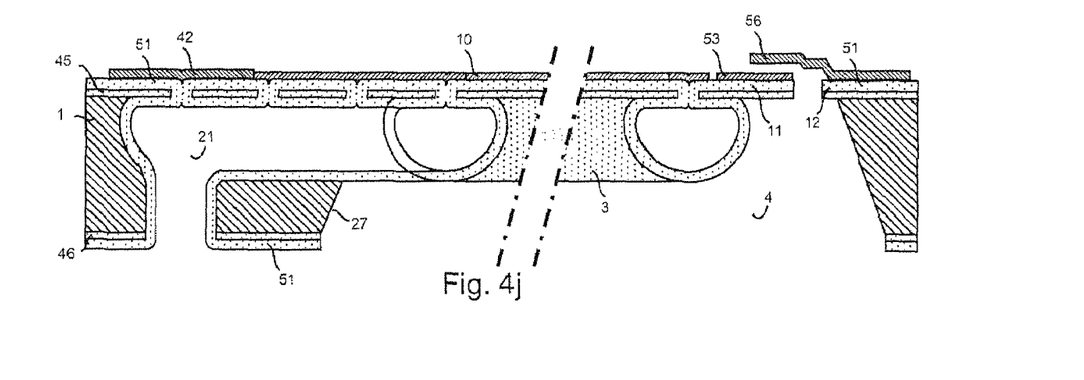

FIG. 4i: patterning of the lower double SiN layer at side 46, with 57 denoting an opening in the 46+51 SiN layer for etching the opening 4.

FIG. 4j is a cross-sectional view taken on the plane IV-j in FIG. 3a: anisotropic KOH etching of the substrate 1 through the mask opening 57 yields this result. The tags 11 and 12 now become functional and can be identified. In this definitive functional arrangement, the former cavity 52 has now been transformed into the embedded tube 21 and the free tube 3. Note that etching of the hole from the side 46 may take place isotropically or anisotropically. Isotropic etching to free the tube 3 may even be done from the 'front', i.e. from side 45 (through the openings 54 in FIG. 4f), but in that case the etching process must be isotropic.

Summarizing, the steps are as follows:
A) Provision of a first SiN layer on both sides of the silicon wafer. The upper side is patterned with the tube structure, the lower side with the holes to be etched.
B) Etching of a hole into the lower side of the wafer to a depth greater than the wafer thickness minus the desired tube thickness.
C) Isotropic etching through the free holes at the upper side: the tube is defined. The longer the etching, the thicker the tube will be.
D) Deposition of the second, thicker SiN layer in an LPCVD tubular oven. All wetted materials thus become SiN.
E) Deposition and patterning of the first metal layer (conductor pattern).
F) Exposing the upper side of the Coriolis tube (at two or three sides).
G) Applying a photoresist layer that is to serve as a spacer for the capacitive read-out.
H) Providing and patterning the second, thicker metal layer. This layer also serves as an intermediate layer for the pressure blocks 13 (cf. FIG. 1).
I) Providing the etching mask for exposing the Coriolis tube through etching.
J) Separating the chip from the wafer by sawing or breaking off. This is facilitated in that the holes are covered by sawing foil at the lower side.

Figure 5A:
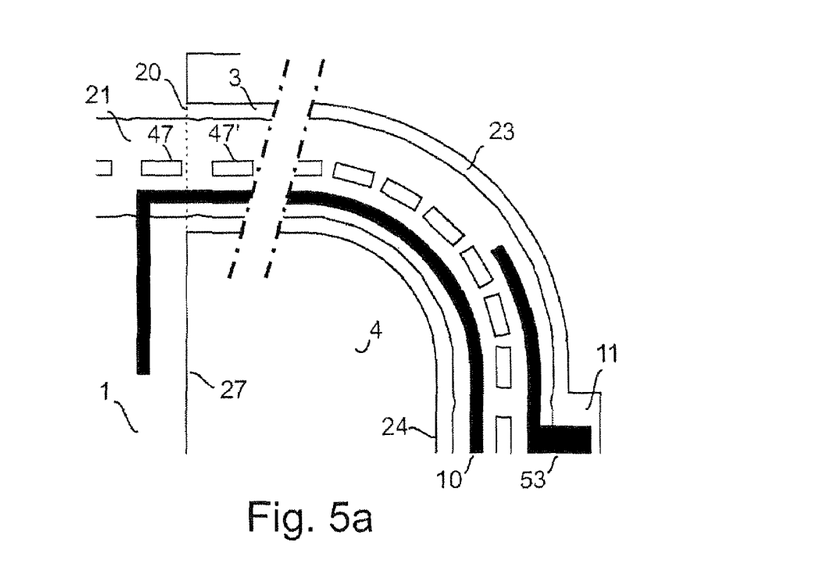
FIG. 5a shows details of the manufacture of a round bend in a tube shape.

FIG. 5a is a plan view showing details of the round bends in the possible tube shapes of a system chip with a Coriolis flow sensor or thermal flow sensor. The method according to the invention utilizes a mask for making round bends during the manufacture of the flow tube, the elongate mask openings having a small pitch and extending substantially tangentially.

Visible are: detail of tube 21 and tube 3 with rounded corner 23 (cf. FIG. 2a); substrate 1; free tube 3; current conductor 10 for Lorentz or thermal excitation; tag 11 with sensing capacitor below electrode; transition 20 from embedded tube 21 to free tube 3; embedded tube 21; bend 23 in tube 3 through pattern of openings 47; front 24 of tube 3; fixed wall 27 in which the transitions 20, 20' are located; electrode 53 for sensing capacitors 10 and 53 (both lying in the first metal layer).

Figure 5B:
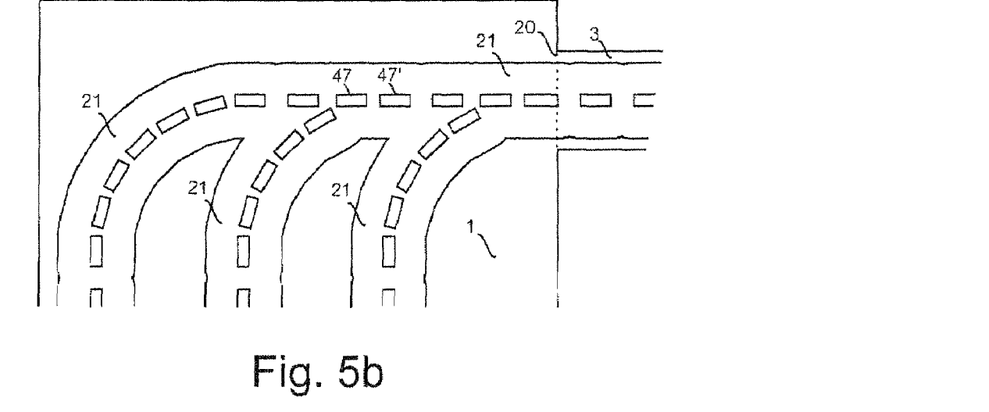
FIG. 5b shows parallel connections to one tube.

FIG. 5b shows an embodiment in which a number of parallel tubes are joined together into one tube. This is a method of obtaining a lower hydraulic resistance. The tubes may be embedded in the substrate, for example, or the same tube structure may be made free in its entirety without a transition 20, i.e. all being of tube type 3 (freely suspended). This may be achieved in that the mask defining the openings of type 54 (FIG. 4f) and the mask defining the opening of type 57 (FIG. 4i) are correspondingly adapted.

Figure 6A:
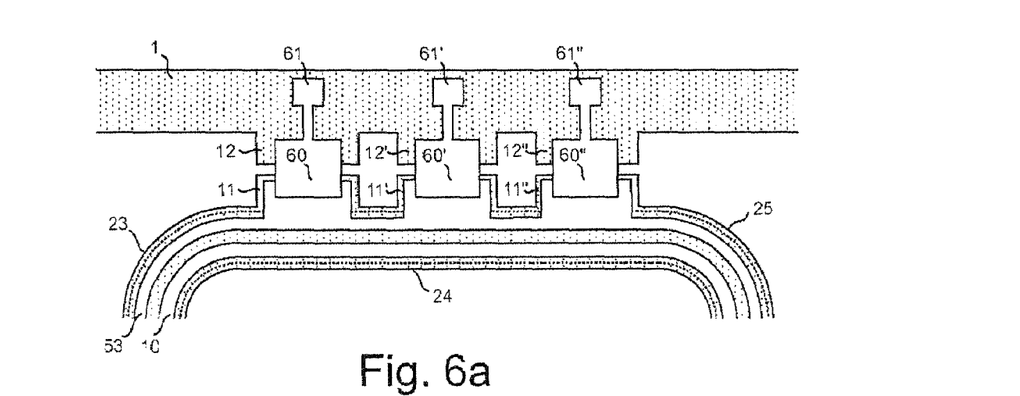
FIGS. 6a and b show details of the capacitive detection means of a system chip.
Figure 6B:
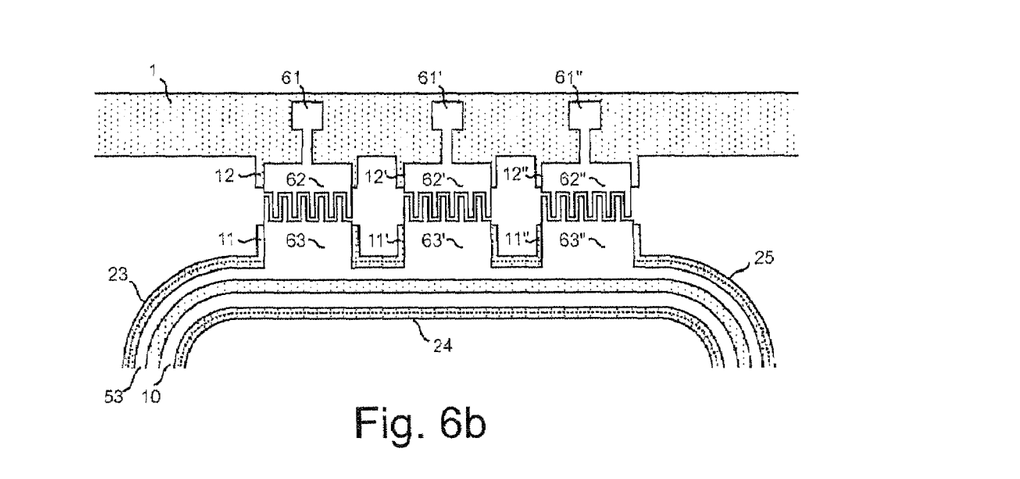

FIGS. 6a and b show two embodiments of the means for capacitive detection of the tube vibrations integrated in a single crystal in more detail. Detail of tube 3, front side 24, with electrodes for capacitive read out, showing: substrate 1; front 2 of free tube; current conductor 10 for Lorentz or thermal excitation; tag 11 at tube 3; tag 12 at opposite side of substrate 1; tube electrode 53 of sensing capacitors; electrodes 60 made in second metal layer; bond pad 61; finger electrode 62 at the substrate side; finger electrode 63 at the tube side.

The tags are at two levels in the embodiment of FIG. 6a, so that a spacer layer is necessary. In the embodiment of FIG. 6b, the tags (the mutually intertwining fingers) are located in one plane, which provides a greater design freedom.

Figure 7A:
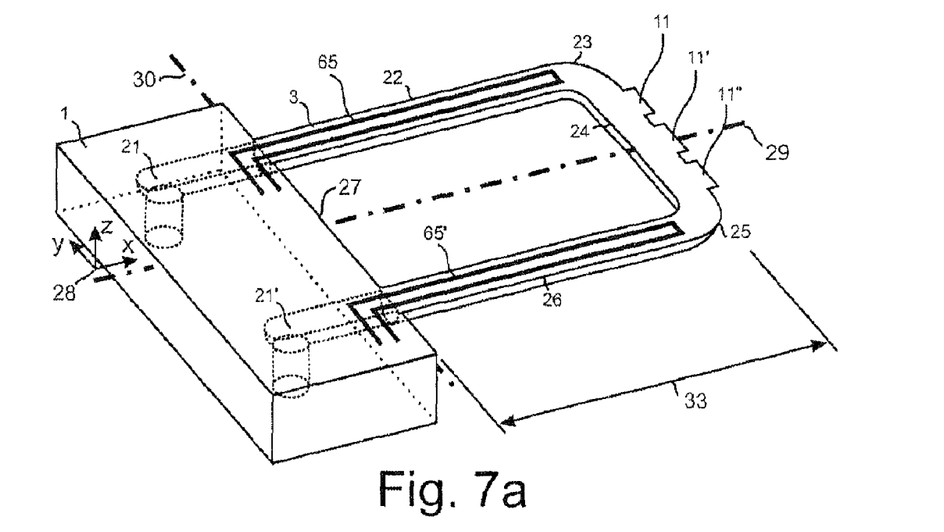
FIG. 7a is an elevation of a system chip with Coriolis tube with thermal excitation means.

FIG. 7a shows part of a system chip with a U-shaped Coriolis tube and means for thermal excitation of the tube vibrations, representing a general view of thermal excitation. Two independent heater resistors 65, 65' arranged on the legs 22 and 26 of the U-shaped Coriolis tube 3 do and do not heat the legs in alternation. This causes the tube 3 to perform a torsional movement about the axis 29 (so this is unlike the situation of FIG. 2a, where thermal actuation always generates the flapping mode). When electric power is dissipated in the heater resistor 65, the temperature in tube portion 22 rises and this portion bends in downward direction.

When electric power is dissipated in the heater resistor 65', the same happens there. Accordingly, the tube will perform a twisting movement about the axis 29 owing to the alternating dissipation of power in the legs.

Figure 7B:
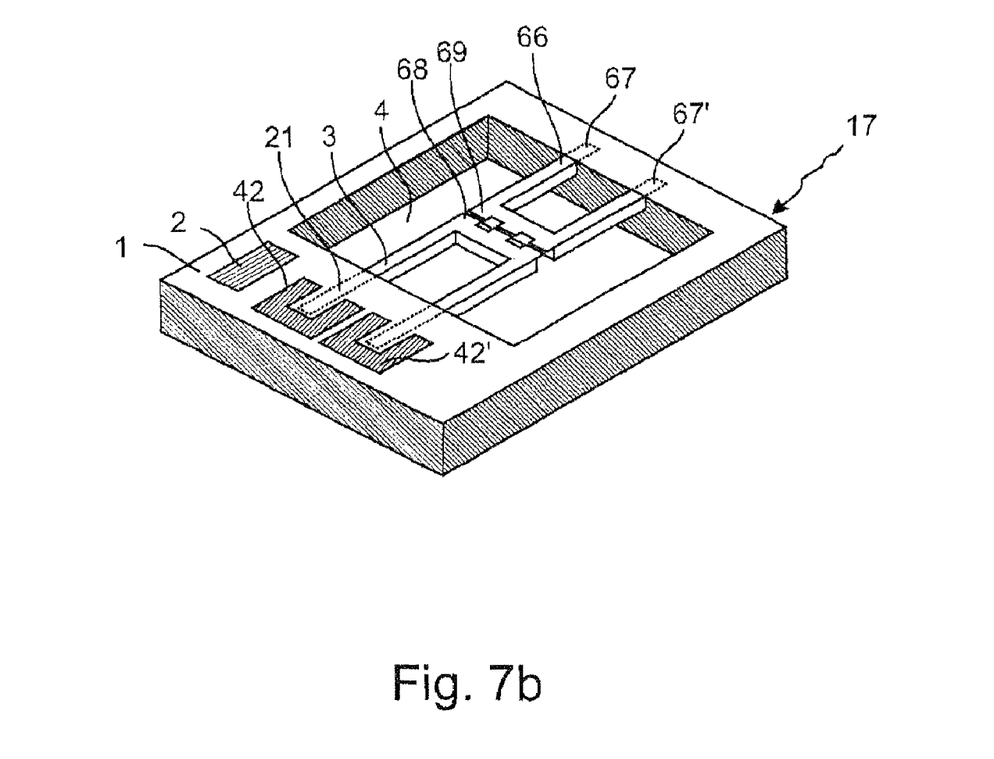
FIG. 7b diagrammatically shows a system chip with Coriolis tube with alternative capacitive sensing means.

FIG. 7b shows part of a system chip with a U-shaped Coriolis tube 3 suspended at one side of the opening 4 and provided with electrodes 68, 69 for the capacitive read out. An additional U-tube 66 suspended at the opposite side of the opening 4 is located straight opposite the U-tube 3 so as to position the finger-shaped electrodes on the tags 68 and 69 exactly at the same z-level. The excitation in the case of FIG. 7b may be the same as in FIG. 7a.

Figure 8:
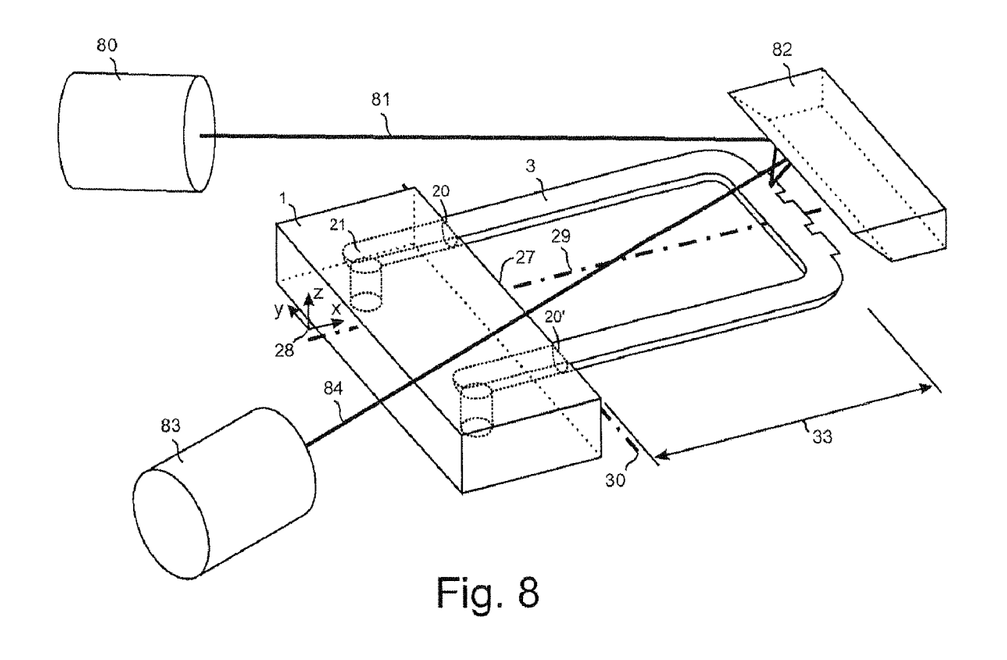
FIG. 8 shows a system chip with Coriolis tube and optical detection means.

FIG. 8 shows part of a system chip with Coriolis tube 3 comprising means for optically reading out the movement of the Coriolis tube 3. A laser PSD (position sensitive detector) combination measures the translation and rotation of a reflection position on the tube 3 (a metal layer on the tags 11, 11' and 11" also used in the preceding embodiments yields three measuring spots for three laser PSDs).

Visible are: laser 80; light beam 81 from laser; mirror 82 oriented at an angle of 45° so as to direct the beam to the tube 3; position sensitive detector 83; beam 84 incident on the PSD after three reflections.

Figure 9A:
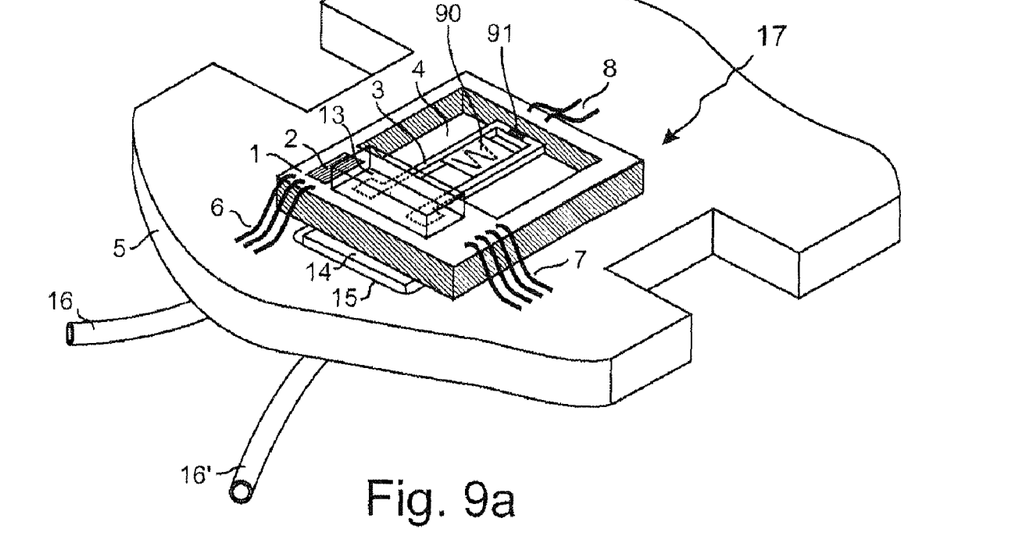
FIG. 9a shows a first embodiment of a system chip with a flow sensor of the thermal type.

FIG. 9a shows part of a flowmeter with a system chip and a thermal flow sensor manufactured by means of the technology discussed above. The substrate 1 has an opening 4 in which a loop-shaped tube 3 having a U-shape is freely suspended. The tube 3 is connected to embedded channels in the substrate 1. A heater resistor 91 is arranged in the center of the connecting limb of the free tube 3. A thermopile 90 is arranged between the two legs of the free tube 3 for measuring a temperature difference between the legs, which temperature difference is a measure for the flow. The U-shaped tube may optionally be fixed by the connecting limb of the U to the wall of the opening 4 opposite thereto.

All this is arranged such that the flowmeter operates in accordance with the thermal flow sensor principle disclosed in EP 774 649.

Figure 9B:
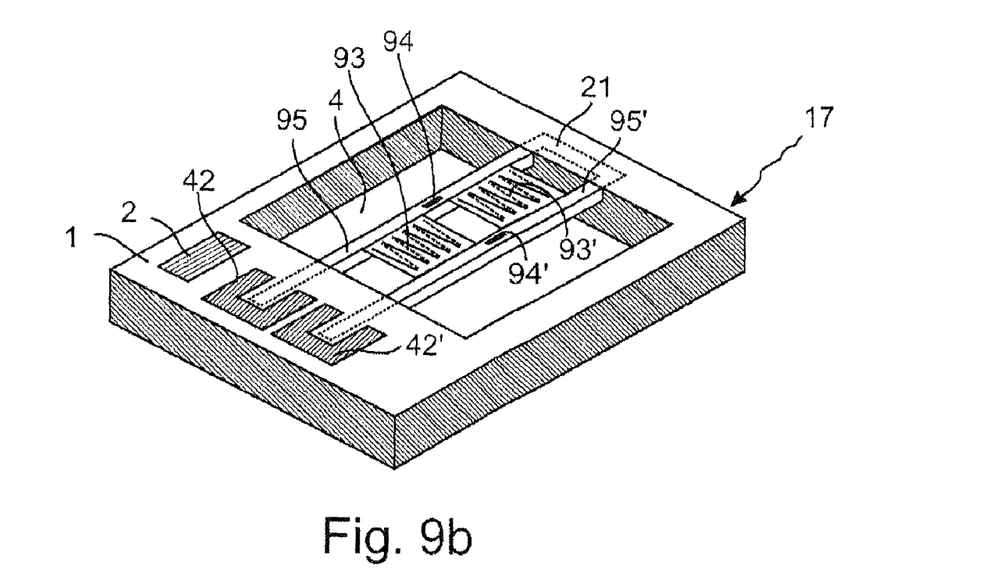
FIG. 9b shows a second embodiment of a system chip with a flow sensor of the thermal type.

FIG. 9b shows an alternative to the embodiment of FIG. 9a. The U-shaped free loop of FIG. 9a is transformed into a loop of which two legs 95 and 95' are freely suspended and reach completely across the opening 4, whereas the connecting limb between the two legs is an embedded channel 21 in the substrate 1. Heater resistors 94, 94' are provided in the centers of the two legs 95, 95', respectively. Thermopiles 93 and 93' are symmetrically arranged between the two legs 95, 95' on either side of the heaters 94, 94'. This makes FIG. 9b a double version of FIG. 9a.

A thermal flow sensor based on the so-termed TBA (Temperature-Balance-Anemometry) principle is also suitable for being manufactured by the above technology.

The Lorentz excitation may be achieved in an alternative manner by means of a magnet yoke instead of the two permanent magnets.

Figure 10A:
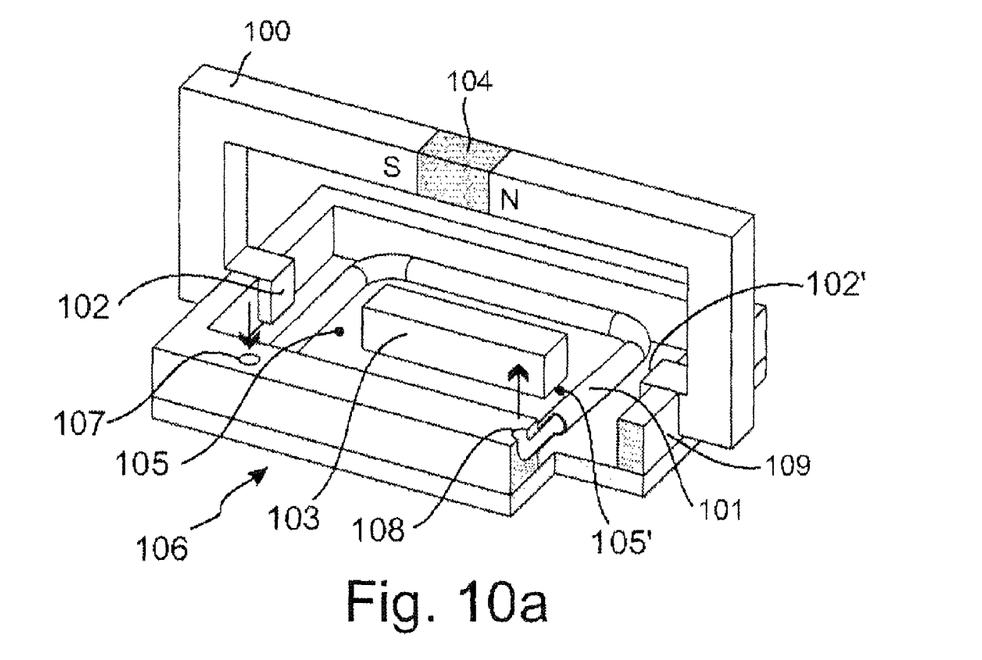
FIG. 10 shows a system chip with Coriolis tube with a magnet yoke for Lorentz force excitation.
Figure 10B:
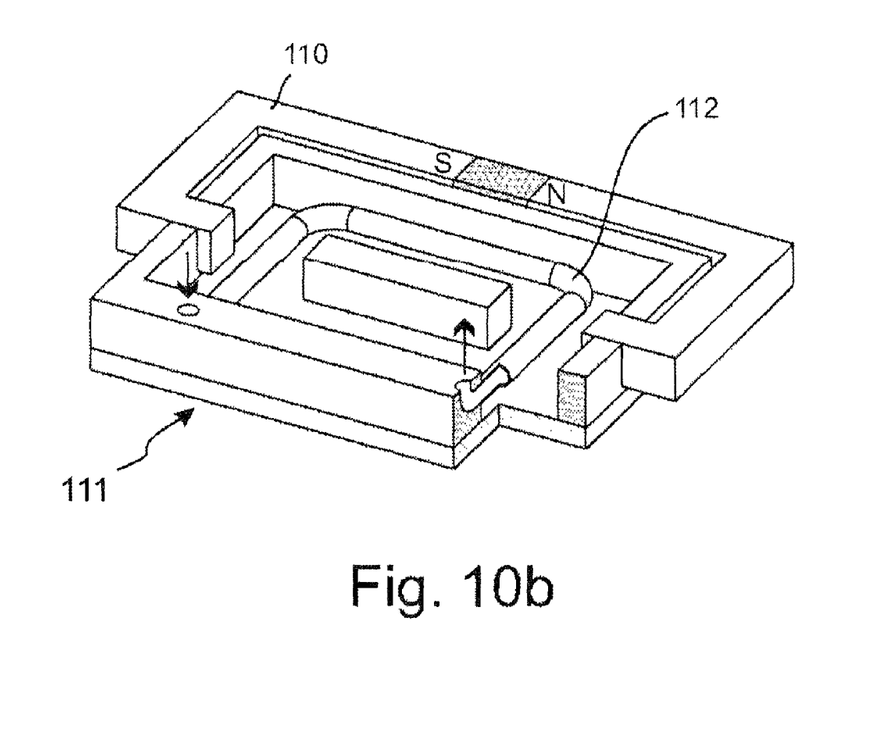

FIGS. 10a and 10b show a system chip 106 with a Coriolis tube 101 and a magnet yoke 100 for Lorentz excitation of the Coriolis tube. FIG. 10a shows a loop-shaped (U-shaped in this case) Coriolis tube 101 with the magnet yoke 100 in vertical position (in a plane transverse to the plane of the Coriolis tube 101).

The magnet yoke 100 for Lorentz excitation, in which a permanent magnet is accommodated, is to provide a loop of a soft magnetic material, such as soft iron, that is as fully closed as possible, with air gaps only in those locations where the Coriolis flow tube 101 crosses the path of the loop. A minimum resistance for the magnetic field lines crossing between the poles 102, 102' is realized thereby. The preferred embodiment of the magnet yoke 100 is that which comprises not only the C- or U-shaped portion at the outer side of the tube 101, but also a smaller, beam-type part 103 within the loop of the tube 101. Said part shortens the path to be crossed by the field lines and thus reduces the magnetic resistance, so that a smaller magnet and/or a weaker current through a conducting layer on the tube 101 can suffice for realizing a given Lorentz force. In addition, the beam-type part 103 acts as a flux guide: it draws the fields lines towards itself so that there is no interfering magnetic field acting on locations of the tube outside the air gaps 105, 105'. The C- or U-shaped portion is built up from two symmetrical halves between which the permanent magnet 104 is placed. (It is noted that the C-shaped portion is in fact a U-shaped portion provided with pole shoes.)

The system chip 106 with the Coriolis tube 101 is manufactured from a thin silicon wafer in a number of etching and deposition steps in the 'microchannel' process. This results in a tube that is freely suspended from its inlet and outlet tubes 107, 108 in a silicon frame 109. This frame 109 is open at two sides. A closed, comparatively flat box is created in that a bottom and lid are glued to the frame 109 in a next manufacturing step. This box may be evacuated because a tube vibrating in a vacuum can be kept moving with less energy supplied. In the case of an optical measurement of the displacement of the tube 101, with a light source and detector located outside the box, the lid and/or bottom of the box may be manufactured from a transparent material, such as glass.

Before the box is closed, the magnet yoke 100 is placed: the ends of the C-shaped portion of the yoke 100 are glued into recesses of the frame 109 that were etched away during manufacture. The beam-type part 103 of the yoke, which lies within the loop of the tube 101, is glued to the bottom of the box before or after this bottom is glued to the frame 109.

FIG. 10a shows the stage in the manufacture in which the complete magnet yoke 100 has been put in place, but the lid has not yet been glued over the box. The inlet and outlet tubes 107, 108 are shown as issuing into the plane of the frame adjoining the Coriolis tube 101, but they may alternatively lie in the plane of the frame remote from the Coriolis tube 101. The Figure shows the preferred embodiment with a flux-guiding soft magnetic body 103 within the loop of the tube 103.

FIG. 10b shows an embodiment of a system chip 111 with a Coriolis tube 112 wherein a magnet yoke 110 for Lorentz force excitation lies in a plane parallel to the plane of the Coriolis tube 112. In both cases it is necessary for the generation of the Lorentz forces that the Coriolis tube 101, 112 is provided with a conductor pattern or conducting layer (not shown) that is connected to a current source (not shown) so as to pass an alternating current through the tube.

It is noted that in FIGS. 10*a* and 10*b*, as well as in FIG. 1*a*, the Lorentz forces are exerted on the legs of the tube configuration for providing a torque actuation.

It is noted that the embodiments of Lorentz actuation and thermal actuation, with optical or capacitive sensing as described above may also be used in other embodiments of flowmeters with flow tubes manufactured by means of MST, for example the Coriolis flowmeter described in U.S. Pat. No. 6,477,901.

Summarizing, the invention relates to a fluid and flow measuring system comprising a monocrystalline silicon chip in which a SiN tube has been (partly) etched out and a (freely suspended/standing) SiN tube has been (partly) exposed by etching, with (fluid) bottom connections and to a method of manufacturing thereof.

The invention claimed is:

1. A flowmeter comprising:
    a system chip which comprises a flow sensor, the system chip including a silicon substrate with an opening; and
    a silicon nitride flow tube entirely inside the opening for transporting a medium whose flow rate is to be measured, said flow tube having an inlet end and an outlet end, which ends each merge via a side wall of the opening into a silicon nitride coated channel in the silicon substrate.

2. The flowmeter as claimed in claim 1, wherein the silicon substrate is arranged on a carrier, and said silicon nitride coated channels are connected through the carrier to connecting lines to the external world.

3. The flowmeter as claimed in claim 1, wherein the flow tube has a loop shape and stands free from the walls of the opening at three sides.

4. The flowmeter as claimed in claim 1, wherein the flow sensor is of the Coriolis type and comprises means for vibrating the flow tube and means for detecting movement of the flow tube.

5. A flowmeter comprising:
    a system chip which comprises a flow sensor, the system chip including a silicon substrate with an opening; and
    a silicon nitride flow tube inside the opening for transporting a medium whose flow rate is to be measured, said flow tube having an inlet end and an outlet end, which ends each merge via a wall of the opening into a silicon nitride coated channel in the silicon substrate,
    wherein the flow sensor is of the Coriolis type and comprises means for vibrating the flow tube and means for detecting movement of the flow tube,
    wherein the means for vibrating form a Lorentz actuator and include a conductor pattern on the flow tube, means for passing an electric current through the conductor pattern, and means for generating a magnetic field at a portion or portions of the flow tube.

6. The flowmeter as claimed in claim 4, wherein the means for vibrating excite the flow tube thermally.

7. The flowmeter as claimed in claim 4, wherein the means for vibrating operate through heating of a bimorph formed by the flow tube and a conductor pattern on the flow tube.

8. The flowmeter as claimed in claim 5, wherein the means for detecting movement operate capacitively, the conductor pattern acting as one plate of a capacitor, and an electrode on the substrate as the other plate.

9. The flowmeter as claimed in claim 5, wherein the means for detecting movement operate optically, a light beam being directed at the conductor pattern and the reflected light being detected.

10. The flowmeter as claimed in claim 1, wherein the flow tube is U-shaped, lies free from the wall of the opening at three sides, and is associated with a thermopile that is arranged so as to measure a temperature difference between the legs of the U.

11. The flowmeter as claimed in claim 1, wherein the silicon nitride flow tube forms part of a Coriolis flow sensor or of a thermal flow sensor.

12. The flowmeter as claimed in claim 1, comprising a first silicon nitride flow tube for a Coriolis flow sensor and a second silicon nitride flow tube for a thermal flow sensor.

13. The flowmeter as claimed in claim 5, wherein the flow tube has a loop shape presenting two parallel legs, the Lorentz actuator being a torque actuator comprising two aligned magnetic field producing means.

14. The flowmeter as claimed in claim 5, wherein the flow tube has a loop shape presenting two parallel legs, the Lorentz actuator being a torque actuator comprising a magnetic yoke which has two aligned pole ends arranged at the outsides of the legs.

15. Systemchip for a flow measuring system, comprising:
    a silicon substrate with an opening therein; and
    a silicon nitride sensing tube entirely inside the opening, said sensing tube having an inlet end and an outlet end, which ends each merge via a side wall of the opening into a silicon nitride coated channel in the silicon substrate.

* * * * *